United States Patent [19]
Corletti et al.

[11] Patent Number: 5,268,943
[45] Date of Patent: Dec. 7, 1993

[54] NUCLEAR REACTOR WITH MAKEUP WATER ASSIST FROM RESIDUAL HEAT REMOVAL SYSTEM

[75] Inventors: Michael M. Corletti, New Kensington; Terry L. Schulz, Murrysville, both of Pa.

[73] Assignee: Westinghouse Electric Corp., Pittsburgh, Pa.

[21] Appl. No.: 903,635

[22] Filed: Jun. 24, 1992

[51] Int. Cl.⁵ ............................................. G21C 15/18
[52] U.S. Cl. ...................................... 376/282; 376/299
[58] Field of Search ............... 376/282, 283, 298, 299

[56] References Cited

U.S. PATENT DOCUMENTS

| | | | |
|---|---|---|---|
| 4,064,392 | 12/1977 | Desalu | 376/217 |
| 4,587,080 | 5/1986 | Johnson | 376/282 |
| 4,647,425 | 3/1987 | Battaglia et al. | 376/308 |
| 4,694,693 | 9/1987 | Gerlowski | 376/245 |
| 4,753,771 | 6/1988 | Conway et al. | 376/282 |
| 5,180,543 | 1/1993 | Conway et al. | 376/282 |

*Primary Examiner*—Daniel D. Wasil
*Attorney, Agent, or Firm*—J. C. Valentine

[57] ABSTRACT

A pressurized water nuclear reactor uses its residual heat removal system to make up water in the reactor coolant circuit from an in-containment refueling water supply during staged depressurization leading up to passive emergency cooling by gravity feed from the refueling water storage tank, and flooding of the containment building. When depressurization commences due to inadvertence or a manageable leak, the residual heat removal system is activated manually and prevents flooding of the containment when such action is not necessary. Operation of the passive cooling system is not impaired. A high pressure makeup water storage tank is coupled to the reactor coolant circuit, holding makeup coolant at the operational pressure of the reactor. The staged depressurization system vents the coolant circuit to the containment, thus reducing the supply of makeup coolant. The level of makeup coolant can be sensed to trigger opening of successive depressurization conduits. The residual heat removal pumps move water from the refueling water storage tank into the coolant circuit as the coolant circuit is depressurized, preventing reaching the final depressurization stage unless the makeup coolant level continues to drop. The residual heat removal system can also be coupled in a loop with the refueling water supply tank, for an auxiliary heat removal path.

12 Claims, 2 Drawing Sheets

NUCLEAR REACTOR WITH MAKEUP WATER ASSIST FROM RESIDUAL HEAT REMOVAL SYSTEM

GOVERNMENT CONTRACT

Government of the United States of America has rights in this invention pursuant to Contract No. DE-AC03-90SF18495 awarded by the Department of Energy.

BACKGROUND OF THE INVENTION

The invention relates to a nuclear reactor system which includes means for injecting additional coolant into the reactor coolant circuit, and in particular to a system wherein the residual heat removal apparatus which thermally couples the coolant circuit system to heat exchangers for removing residual heat is couple-able into fluid communication between an in-containment refueling water supply tank and the reactor coolant circuit as a means to inject additional coolant. The invention is applicable to reactor systems having passive safety features, with depressurization of the reactor coolant circuit to facilitate injection of additional coolant water.

A nuclear reactor such as a pressurized water reactor circulates coolant at high pressure through a coolant circuit traversing a reactor vessel containing nuclear fuel for heating the coolant, a steam generator operable to extract energy from the coolant. A residual heat removal system is typically provided to remove decay heat during shutdowns. In the event of a loss of coolant, means are provided for adding additional coolant. A coolant loss may involve only a small quantity, whereby additional coolant can be injected from a relatively small high pressure makeup water supply, without depressurizing the reactor coolant circuit. If a major loss of coolant occurs, it is necessary to add coolant from a low pressure supply containing a large quantity of water. Whereas it is difficult using pumps to overcome the substantial pressure of the reactor coolant circuit (e.g., 2,250 psi or 150 bar), the reactor coolant circuit is depressurized so that coolant water can be added from an in-containment refueling water storage tank at ambient pressure in the containment shell.

The Westinghouse AP600 reactor system, of which the present invention is a part, uses a staged pressure reduction apparatus for depressurizing the coolant circuit. A series of valves couple the reactor outlet (also known as the "hot leg" of the coolant circuit) to the inside of the containment shell. The valves operate at successively lower pressures. When initially commencing depressurization, the coolant circuit and the containment structure are coupled by depressurization valves through one or more smaller conduits along a flow path with not-insubstantial back pressure. As the pressure in the coolant circuit drops, additional conduits are opened by further depressurization valves in stages, each stage opening a larger and/or more direct flow path between the coolant circuit and the containment shell.

The initial stages couple a pressurizer tank which is connected by a conduit to the coolant circuit hot leg, to spargers in an in-containment refueling water supply tank. The spargers comprise conduits leading to small jet orifices submerged in the tank, thus providing back pressure and allowing water to condense from steam emitted by the spargers into the tank. The successive depressurization stages have progressively larger conduit inner diameters. A final stage has a large conduit that couples the hot leg directly into the containment shell, for example, at a loop compartment through which the hot leg of the reactor circuit passes. This arrangement reduces the pressure in the coolant circuit expeditiously, substantially to atmospheric pressure, without sudden hydraulic loading of the respective reactor conduits. When the pressure is sufficiently low, water is added to the coolant circuit by gravity flow from the in-containment refueling water supply tank.

Automatic depressurization in the AP600 reactor is a passive safeguard which ensures that the reactor core is cooled even in the case of a major loss of coolant accident such as a large breach in the reactor coolant circuit. Inasmuch as the in-containment refueling water storage tank drains by gravity, no pumps are required. Draining the water into the bottom of the containment building where the reactor vessel is located, develops a fluid pressure head of water in the containment sufficient to force water into the depressurized coolant circuit without relying on active elements such as pumps. Once the coolant circuit is at atmospheric pressure and the containment is flooded, water continues to be forced into the reactor vessel, where boiling of the water cools the nuclear fuel. Water in steam escaping from the reactor coolant circuit is condensed on the inside walls of the containment shell, and drained back to be injected again into the reactor coolant circuit.

The foregoing arrangement has been shown to be effective in the scenario of a severe loss of coolant accident. However, there is a potential that if the automatic depressurization system is activated in less dire circumstances, the containment may be flooded needlessly. Depressurization followed by flooding of the reactor containment requires shutdown of the reactor and a significant cleanup effort.

There is a need for a system which is sufficiently responsive to react appropriately to a major accident, but which also minimizes damage and expense if the situation can be remedied appropriately by addition of coolant in excess of the high pressure makeup supply, or perhaps by an orderly shutdown procedure for effecting repairs. This system must be arranged to complement the passive safety system, without retarding or otherwise adversely affecting the ability of the passive safety system to respond to a real accident.

SUMMARY OF THE INVENTION

It is an object of the invention to couple the normal residual heat removal system of a pressurized water nuclear reactor to a passive safeguard system which depressurizes the reactor coolant circuit when adding coolant, in order to preclude disruptive final depressurization steps which may be unnecessary under the circumstances.

It is another object of the invention to provide a non-safety grade coolant additive apparatus associated with the residual heat removal system, for preventing flooding of the reactor containment building in the event of inadvertent or unnecessary actuation of a passive core cooling system using automatic depressurization.

It is a further object of the invention to employ the pumping power of one or more residual heat removal pumps, for functions other than residual heat removal attendant to shutdown, including charging of the reactor coolant system and cooling the in-containment refueling storage tank water.

These and other objects are accomplished by a pressurized water nuclear reactor that normally uses a residual heat removal system for cooling the reactor coolant circuit when the reactor is not operational. According to the invention, the same residual heat removal system is manually coupleable for charging the reactor coolant circuit from an in-containment refueling water supply during staged depressurization. Depressurization stages can be triggered by falling levels of coolant. In a final stage of depressurization, the containment building would be flooded for emergency cooling using the refueling water storage tank, i.e., at atmospheric pressure. Whereas coolant can be added via the residual heat removal system when depressurization is due to inadvertence or a small leak, the residual heat removal system prevents depressurization from proceeding to the final, containment flood stage when such action is not necessary and a more orderly shutdown can be accomplished to effect repairs. Nevertheless, operation of the passive cooling system is not impaired when fast depressurization and passive cooling are called for by an emergency.

A makeup water storage tank is coupled to the reactor coolant circuit, holding coolant at the operational pressure of the reactor. A depressurization system which can be triggered by falling levels of makeup water opens successive conduits leading to spargers in the refueling water storage tank, thus reducing pressure, ultimately to atmospheric pressure. The spargers prevent steam and radiation from being discharged into the containment during the opening of the first three stages of depressurization. At reduced pressure the coolant circuit can be charged by gravity feed from the refueling water storage tank, and/or the reactor can be cooled by flooding the containment building from the refueling water storage tank as a passive cooling means. The residual heat removal system is manually activated for pumping water from the refueling water storage tank, where the water is at ambient pressure, into the still pressurized coolant circuit as the coolant circuit reaches a depressurized prior to flooding of the containment. The staged depressurization system vents the coolant circuit to the containment, reducing the supply of coolant. However, coolant added by the residual heat removal system makes up the lost coolant and thus prevent reaching the final depressurization stage. The residual heat removal system can also be coupled in a loop with the refueling water supply tank, for an auxiliary heat removal path.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
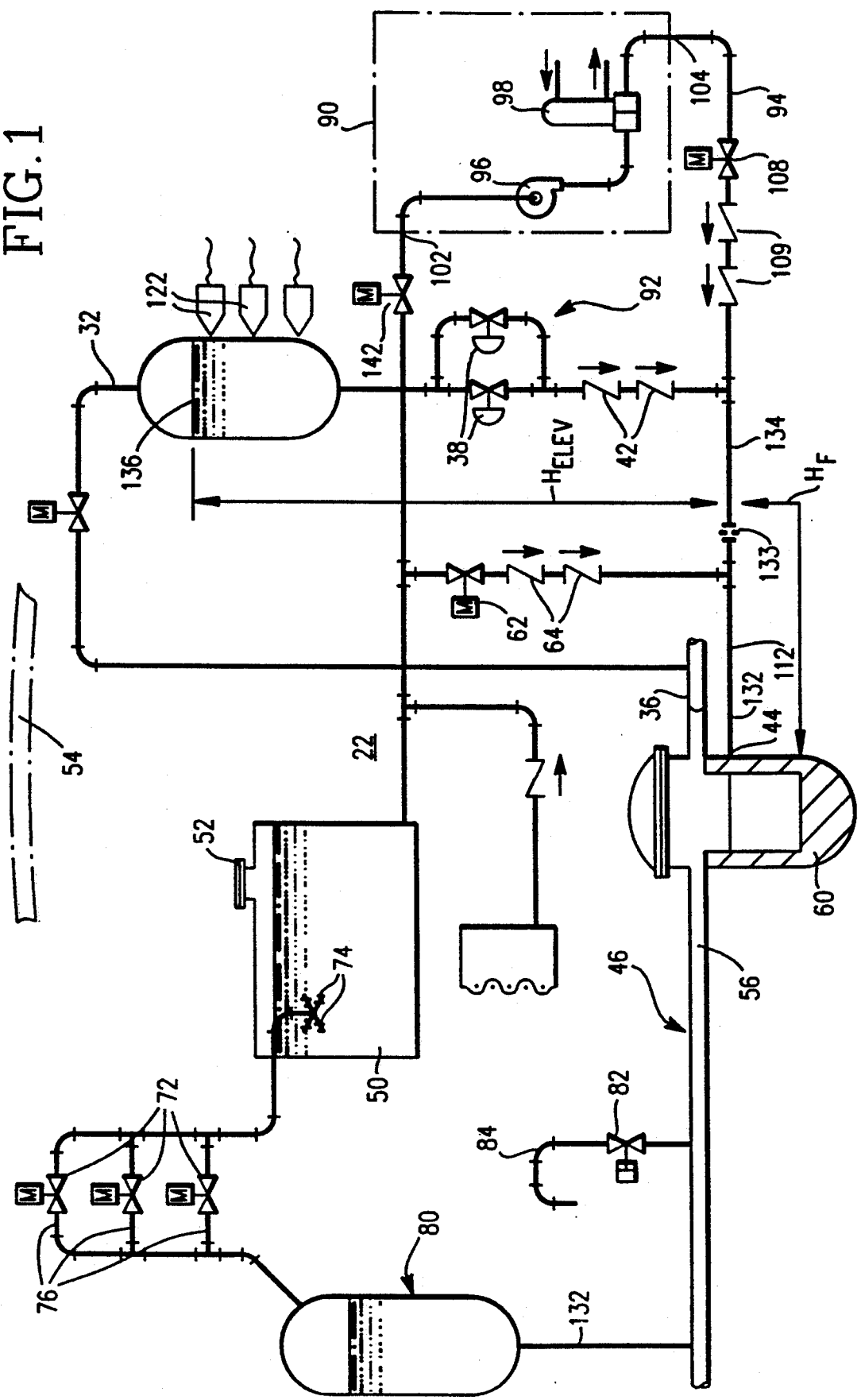
FIG. 1 is a schematic diagram illustrating a nuclear reactor with a residual heat removal system coupled for makeup water assist during automatic depressurization, according to the invention.

In FIG. 1, there are two sources of coolant to make up for losses of coolant in the nuclear reactor 22. An inlet 32 of high pressure makeup tank 33 is coupled by valves 35 to the reactor coolant inlet or "cold leg" 36. The high pressure makeup tank 32 is also coupled by motorized valves 38 and check valves 42 to a reactor vessel injection inlet 44. The high pressure makeup tank 33 is operable to supply additional coolant to the reactor coolant circuit 46, at the operational pressure of the reactor, to make up for losses. However, the high pressure makeup tank 33 contains only a limited supply of coolant.

A much larger quantity of coolant water is available from the in-containment refueling water storage tank 50, at atmospheric pressure due to vent 52, which opens from tank 50 into the interior of the containment building 54. When the reactor 22 is operating, the coolant circuit operational pressure is on the order of 2,250 psi (150 bar). Therefore, in order to add coolant to the reactor vessel 60 and the coolant circuit 46 coupled thereto, the system must be depressurized, i.e., brought down to atmospheric or nearly atmospheric pressure in the containment. According to the invention, the coolant circuit 46 is depressurized in stages, to limit the thermal and hydraulic loading on the conduits 36, 56 and the reactor vessel 60 due to depressurization by venting into the containment 54.

The nuclear reactor 22 in the example shown is depressurized by venting the coolant circuit 46 into the containment 54 in four stages of decreasing pressure, the last stage characterized by direct coupling of the coolant circuit 46 to the interior of the containment 54. In the last stage, coolant from the refueling water storage tank 50 can be fed by gravity through motorized valve 62 and check valves 64 into the reactor vessel injection inlet 44. Additionally, in the last stage the containment building 54 can be flooded with water from the refueling water storage tank 50. Water in the containment 54 thus drains by gravity into the coolant circuit 46 and is boiled by the nuclear fuel. Steam thereby generated is vented into the containment 54, where water condenses on the relatively cooler containment walls. The condensed water drains back into the bottom of the containment 54 and is recycled, the system providing a passive cooling means independent of pumps and other actively powered circulation elements.

During staged depressurization as shown in FIG. 1, three initial stages are achieved successively by opening the initial stage depressurization valves 72 coupled via spargers 74 between the coolant circuit 46 and the containment shell 54. The respective valves 72 in each depressurization leg 76 are opened at successively lower pressures and preferably are coupled between the coolant system pressurization tank 80 and the spargers 74 submerged in the refueling water supply tank 50 in parallel legs along conduits 76. The successively opened conduits 76 are progressively larger for the successive stages, thus venting the coolant circuit 46 more and more completely to the containment 54. The final stage of depressurization, achieved by opening valve means 82, can use the largest conduit 84 and directly couples the coolant circuit 46 to the containment shell 54 (rather than through the spargers 74 in the refueling water supply tank 50), for example opening in a loop compartment in the containment 54 containing the reactor outlet conduit 56 which leads to an electrical steam generator (not shown).

The coolant circuit 46 of a reactor having such passive cooling safeguards, including a staged depressurization system, is coupled according to the invention to a residual heat removal system 90, whereby makeup water can be supplied to the coolant circuit 46 before depressurization reaches the final stage. The residual heat removal system 90 normally is activated only during shutdown, for removing normal decay heat from the reactor core. Whereas the residual heat removal system is manually activated, it is not intended as a safety-grade apparatus for cooling in the event of an accident. However, by arranging a coupling between the residual heat removal system 90 and the reactor coolant circuit 46, it is possible to use the residual heat removal pumps for moving coolant from the refueling water supply 50 into the coolant circuit 46 or for cooling the water in the refueling water supply 50.

Referring to FIG. 1, a nuclear reactor having a reactor vessel 60 disposed in a containment shell 54, has a normally pressurized coolant circuit 46 including the reactor vessel. A refueling water storage tank 50 at atmospheric pressure is coupled to a coolant addition system 92 operable to depressurize the coolant circuit 46 for adding coolant from the refueling water storage tank 50 to the coolant circuit at reduced pressure. A residual heat removal loop 94 having at least one pump 96 and at least one heat exchanger 98, the residual heat removal loop 94 having an inlet 102 and an outlet 104, is coupleable to the coolant circuit 46 by manually operable valves 106, 108. Suitable check valves 109 are provided in series at the outlet of the residual heat removal loop 94.

Figure 2:
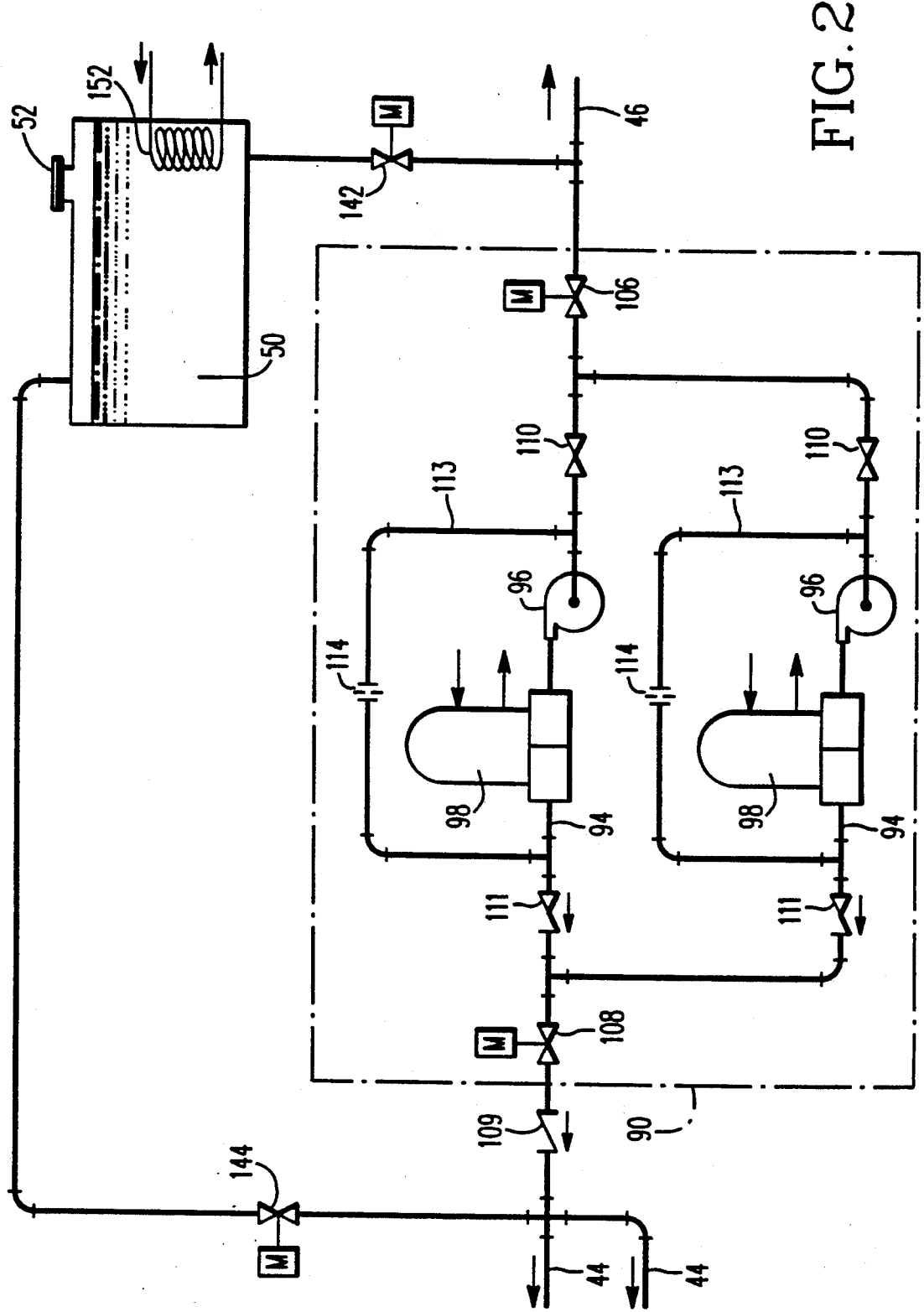
FIG. 2 is a schematic diagram illustrating the residual heat removal means in more detail, and in particular the valving arrangements between the respective elements.

The preferred system as shown in FIG. 2 includes two residual heat removal legs 94 having respective pumps 96 and heat exchangers 98. When the residual heat removal pumps 96 are coupled by the valves 106, 108 between the refueling water supply 50 and the coolant circuit 46, i.e., during depressurization of the coolant circuit prior to reaching the final stage of depressurization, the pumps 96 inject water from the refueling water supply 50 into the direct vessel injection line 112. Injection can occur when the reactor coolant circuit pressure drops to below the shutoff head of the pumps 96.

Inlet isolation valves 110 and outlet stop-check isolation valves 111 separate the two parallel coupled residual heat removal legs 94. The pumps 96 can be protected from overpressure problems by including bypass paths 113, having restricted orifices 114 for bleeding off pressure in the event the pumps are activated when the outlet valve 108 is closed or when the pumps 96 cannot exceed the pressure head of the line leading to the reactor injection inlet 44.

Referring again to FIG. 1, the stages of depressurization can be triggered based on the level of coolant in the coolant makeup tank 33. For example, the level of coolant can be determined using sensors 122 disposed at different levels on tank 33, coupled to the reactor control system (not shown) for opening the staged depressurization valves 72 upon reaching a corresponding coolant level.

The pumps 96 discharge into the coolant circuit 46 at a point downstream of the coolant makeup tank 33. Therefore, operation of the pumps 96 can effectively shut off flow from the coolant makeup tank 33. The fluid pressure head loss $H_F$ due to friction between the direct vessel injection port 132 and the connection 134 of the residual heat removal system discharge line 104 is set, by appropriate adjustment of the dimensions of orifice 133, to be equal to the elevation head difference ($H_{ELEV}$) from connection 134 to the water level 136 in the coolant makeup tank 33. Therefore, if the head loss $H_F$ from point 132 to point 134 corresponds to the fluid pressure head due to an elevation in the coolant makeup tank 33 above the coolant elevation at which the final stage depressurization valves 82 are opened, then the final stage depressurization valves 82 will not be opened during injection of coolant from the residual water supply 50 by residual heat removal pumps 96. Activation of the residual heat removal system 90 during depressurization thus prevents the automatic depressurization system from advancing to the stage at which the containment is flooded.

Inasmuch as the coolant circuit 46 is pressurized during operation of the reactor, the stages of depressurization involve a loss of coolant from the reactor coolant circuit 46 at varying rates. The venting of steam and water removes coolant from the circuit 46 and moves the coolant into the refueling water supply tank 50 through the spargers 74, or into the containment structure 54 directly via final stage conduit 84. Accordingly, the level of coolant in makeup tank 33 falls during operation of the depressurization system. The falling level of the makeup supply triggers the next stage of depressurization, proceeding through each of the stages following initiation of automatic depressurization The residual heat removal system 90 precludes unnecessary flooding of the containment 54, for example when the automatic depressurization system 90 is activated inadvertently, or when the loss of coolant triggering the initial stage depressurization is not of a critical nature.

If a critical loss of coolant accident occurs, the residual heat removal system 90 still can be activated manually, without adverse effects. Whether or not the operators activate the residual heat removal pumps 96, if the level in the coolant makeup tank 33 drops to the level at which final stage depressurization is triggered (e.g., at 25% of the volume of the coolant makeup tank), the coolant circuit 46 is vented to the containment 54, and coolant flows by gravity from the refueling water supply 50 to the coolant circuit 46 and/or to the bottom of the containment 54, effecting passive cooling. Thus the invention does not hinder the passive cooling system, and in fact provides an additional core cooling margin while protecting against unnecessary flooding of the containment building 54.

The preferred valving arrangement as shown in FIG. 2 includes at least one inlet valve 142 coupled to an inlet 102 of the residual heat removal system 90, selectively coupling the residual heat removal system to one of the coolant circuit 46 and the refueling water storage tank 50, and at least one outlet valve 144 coupled to an outlet 104 of the residual heat removal system 90, selectively coupling the residual heat removal system 90 to either the coolant circuit 46 or the refueling water storage tank 50. This provides the further capability of using the residual heat removal system 90 to cool the refueling water storage tank 50. For this purpose the inlet 102 and outlet 104 of the residual heat removal system 90 both are coupled to the refueling water supply tank 50, in a coolant loop apart from the reactor coolant circuit 46. Cooling of the refueling water supply 50 is useful in the event a supplemental heat exchanger 152 is arranged in the refueling water supply tank 50, or if the refueling water supply 50 has become heated by operation of the depressurization system to vent steam and hot water into the refueling water supply.

The foregoing discussion includes only a single core makeup tank and a single direct reactor vessel injection line. In the event the passive cooling system employs more than one high pressure makeup tank and/or direct reactor vessel injection port, then it is necessary to couple one or more legs of the residual heat removal system to each of the high pressure tanks and/ direct injection ports, substantially as shown in FIG. 1. For example, in FIG. 2, two direct reactor vessel injection ports are shown coupled to the residual heat removal system.

The invention having been disclosed, a number of alternatives will now become apparent to those skilled in the art. The foregoing embodiments are illustrative, and are not intended to limit the particulars of the invention in which exclusive rights are claimed. Reference should be made to the appended claims rather than the discussion of preferred embodiments, in order to assess the scope of the invention in which exclusive rights are claimed.

What is claimed is:

1. A nuclear reactor having a reactor vessel disposed in a containment shell, a normally pressurized coolant circuit including the reactant vessel, a refueling water storage tank, and a coolant addition system operable to depressurize the coolant circuit for adding coolant from the refueling water storage tank to the coolant circuit at reduced pressure, the reactor comprising:
    a residual heat removal loop having at least one pump and at least one heat exchanger, the residual heat removal loop having an inlet and an outlet both coupleable to the coolant circuit, the pump being operable in a normal mode to extract coolant from the coolant circuit and to move the coolant through the heat exchanger, the coolant being returned to the coolant circuit through the outlet of the residual heat removal loop;
    a controllable valving arrangement coupled between the inlet of the residual heat removal loop and the refueling water storage tank, the controllable valving arrangement including at least one coupling valve operable in conjunction with the residual heat removal loop for adding water from the refueling water storage tank to the coolant circuit; and
    an automatic depressurization system having a plurality of conduits including depressurization valves, coupling the coolant circuit and the containment shell, the depressurization valves being operable to open the conduits at successively lower levels of the high pressure makeup tank in stages of depressurization, and further comprising control means operable to activate the residual heat removal loop at one of the stages.

2. The reactor according to claim 1, wherein the refueling water storage tank is maintained at atmospheric pressure and the controllable valving arrangement and the residual heat removal system are operable to add said water to the coolant circuit at a pressure above said atmospheric pressure.

3. The reactor according to claim 2, wherein the residual heat removal system includes at least one pump, and wherein an output of the pump is coupleable by the valving arrangement to a water injection port of the reactor vessel.

4. The reactor according to claim 1, wherein said stages of depressurization are triggered as a function of a level of coolant in the coolant circuit, and wherein one of the conduits openable during a final stage of depressurization couples the coolant circuit directly to the containment shell, whereby activation of the residual heat removal loop forestalls said final stage by addition of coolant.

5. The reactor according to claim 4, further comprising a pressurizer tank coupled to the coolant circuit, and wherein at least one initial stage of depressurization is accomplished by opening an initial stage depressurization valve coupling the pressurizer tank to a sparger in the refueling water storage tank.

6. The reactor according to claim 5, further comprising a high pressure makeup water storage tank having a makeup water supply at substantially a pressure of the coolant circuit, and further comprising sensing means associated with the high pressure makeup water storage tank for sensing a level of coolant available in the high pressure makeup water storage tank, and wherein the depressurization valves are responsive to the sensing means.

7. A pressurized water nuclear reactor, comprising:
    a reactor vessel disposed in a containment building, for heating a coolant at an operational pressure via nuclear fuel, the reactor vessel being coupled via a hot leg conduit and a cold leg conduit for generating electrical power when the reactor is operational, said reactor vessel and conduits being included in a primary coolant circuit of the reactor;
    a high pressure makeup water storage tank selectively coupleable to the primary coolant circuit via makeup supply valves, the high pressure makeup water storage tank holding a supply of makeup coolant substantially at the operational pressure;
    a refueling water storage tank at ambient pressure of the containment building, the refueling water storage tank being selectively coupleable to the coolant circuit for adding coolant upon depressurization of the primary coolant circuit;
    a depressurization system operable to vent the primary coolant circuit into the containment building in a plurality of depressurization stages characterized by progressively reduced amounts of coolant in the supply of makeup coolant;
    a residual heat removal system including at least one heat exchanger and at least one pump, the residual heat removal system being normally operable following depressurization of the primary coolant circuit for removing residual heat from the primary coolant circuit when the reactor is not operational; and,
    wherein the residual heat removal system is selectively coupleable to pump coolant from the refueling water storage tank to the primary coolant circuit during at least one of the depressurization stages, whereby the residual heat removal system is operable selectively to increase a quantity of coolant in the primary coolant circuit at a pressure above the ambient pressure in the containment building.

8. The nuclear reactor according to claim 7, wherein the depressurization system comprises a pressurizer tank coupled to the primary coolant circuit and a plurality of conduits coupled to spargers in the refueling water storage tank, the conduits having depressurization valves for opening the conduits during the stages of depressurization, thereby successively increasing coupling between the primary coolant circuit and the containment building, the residual heat removal system being operable to preclude depressurization to a final one of the stages of depressurization by addition of coolant from the refueling water storage tank.

9. The nuclear reactor according to claim 8, wherein in a final stage of depressurization the containment building is flooded from the refueling water storage tank, said residual heat removal system being operable to preclude flooding of the containment building during depressurization by enabling addition of coolant above the ambient pressure in the containment building.

10. The nuclear reactor according to claim 7, wherein the residual heat removal system includes at least two parallel legs, each of the legs including a pump and a heat exchanger.

11. The nuclear reactor according to claim 7, further comprising a heat exchanger in the refueling water storage tank controllably coupleable to a heat source of the reactor, and wherein the residual heat removal system is operable to extract heat from the refueling water storage tank as a means for removing heat from said source.

12. The nuclear reactor according to claim 11, wherein the heat source is the reactor vessel.

* * * * *